(12) United States Patent
Peiffer et al.

(10) Patent No.: US 6,607,808 B2
(45) Date of Patent: Aug. 19, 2003

(54) BIAXIALLY ORIENTED POLYESTER FILM HAVING AT LEAST ONE MATT SIDE

(75) Inventors: Herbert Peiffer, Mainz (DE); Stefan Bartsch, Wiesbaden (DE); Martin Mueller-Roosen, Mainz (DE)

(73) Assignee: Mitsubishi Polyester Film GmbH (DE)

( * ) Notice: Subject to any disclaimer, the term of this patent is extended or adjusted under 35 U.S.C. 154(b) by 0 days.

(21) Appl. No.: 09/949,745

(22) Filed: Sep. 10, 2001

(65) Prior Publication Data

US 2002/0071945 A1 Jun. 13, 2002

(30) Foreign Application Priority Data

Oct. 14, 2000 (DE) .......................... 100 51 082

(51) Int. Cl.[7] .................... B32B 27/08; B32B 27/18; B32B 27/20; B32B 27/36; B32B 27/30
(52) U.S. Cl. .................... 428/141; 428/213; 428/215; 428/323; 428/337; 428/480; 428/910; 264/288.4; 264/289.3; 264/290.2; 525/437; 525/444
(58) Field of Search .................... 428/480, 323, 428/910, 141, 212, 213, 215, 332, 337; 264/288.4, 290.2, 289.3; 525/437, 444

(56) References Cited

U.S. PATENT DOCUMENTS

| | | | | |
|---|---|---|---|---|
| 3,154,461 A | | 10/1964 | Johnson | |
| 4,399,179 A | * | 8/1983 | Minami et al. | 428/212 |
| 4,568,616 A | * | 2/1986 | Seifried et al. | 428/480 |
| 5,073,435 A | | 12/1991 | Eyraud et al. | |
| RE34,727 E | * | 9/1994 | Utsumi et al. | 428/220 |
| 6,054,212 A | * | 4/2000 | Peiffer et al. | 428/195 |
| 6,358,604 B1 | * | 3/2002 | Peiffer et al. | 428/336 |
| 2002/0068158 A1 | * | 6/2002 | Peiffer et al. | 428/220 |
| 2002/0068159 A1 | * | 6/2002 | Peiffer et al. | 428/220 |
| 2002/0114944 A1 | * | 8/2002 | Peiffer et al. | 428/336 |

FOREIGN PATENT DOCUMENTS

| | | | |
|---|---|---|---|
| DE | 2 353 347 A | 5/1974 | |
| EP | 0 053 498 A2 | 6/1982 | |
| EP | 0 347 646 A2 | 12/1989 | |
| EP | 0976548 A2 * | 2/2000 | |
| EP | 0 976 548 A2 | 2/2000 | .......... B32B/27/36 |
| GB | 2012617 A * | 8/1979 | |
| JP | 07 117120 A | 5/1995 | .......... B29C/55/12 |
| JP | 2001 220453 A | 8/2001 | .......... C08J/5/18 |

* cited by examiner

Primary Examiner—Vivian Chen
(74) Attorney, Agent, or Firm—ProPat, L.L.C.

(57) ABSTRACT

The invention relates to a biaxially oriented polyester film having at least one matt side and composed of at least one base layer (B) made from a thermoplastic polyester and of, applied to this base layer (B), at least one matt outer layer (A) which comprises at least 70% by weight of thermoplastic polyester. The outer layer (A) has a characteristic matt surface and characteristic optical properties and has good suitability for use as a packaging film or for industrial application. The invention further relates to the use and to a process for its production.

14 Claims, 2 Drawing Sheets

BIAXIALLY ORIENTED POLYESTER FILM HAVING AT LEAST ONE MATT SIDE

BACKGROUND OF THE INVENTION

1. Field of the Invention

The invention relates to a coextruded, biaxially oriented polyester film having at least one matt side and composed of at least one base layer (B) made from a thermoplastic polyester, and of, applied to this base layer (B), at least one matt outer layer (A) which comprises at least 70% by weight of thermoplastic polyester, based on the total weight of the matt outer layer (A). The outer layer (A) has a characteristic matt surface and characteristic optical properties and has good suitability for use as a packaging film or for industrial applications. The invention further relates to the use of this film and to a process for its production.

2. Description of the Related Art

The packaging industry has a high requirement for transparent, high-gloss plastic films, e.g. biaxially oriented polypropylene films or biaxially oriented polyester films. In addition, there is increasing requirement for transparent films of this type in which at least one surface layer is not high-gloss but has a characteristic matt appearance giving, for example, the packaging an appearance which is particularly attractive and therefore effective for promotional purposes.

EP-A 347 646 describes a biaxially oriented polyester film which has at least one outer layer A which comprises a filler at a concentration of from 0.5 to 50%, the diameter of this filler having a particular relationship to the thickness of the outer layer A. The outer layer A also has a certain thickness and has a certain degree of crystallinity determined with the aid of Raman spectroscopy. The topography of the outer layer A makes the film particularly suitable for magnetic recording tapes. The specification gives no information about the gloss achieved for the outer layer A. A film produced (Example 1) in accordance with EP-A 347 646 did not have the desired matt surface. The gloss of this surface was outside the range claimed in this specification.

EP-A-0 053 498 describes a biaxially oriented polyester film having more than one layer and having a transparent base layer and, on at least one side of this layer, another layer of matt appearance. The layer of matt appearance essentially consists of a polyethylene terephthalate copolyester whose copolymer comprises from 1 to 20 mol % of H(—OCH$_2$CH$_2$—)$_n$OH or H(—OCH$_2$CH$_2$—)$_{n-1}$O—C$_6$H$_4$—O—(CH$_2$—CH$_2$O—)$_{n-1}$H or H(—OCH$_2$CH$_2$—)$_{n-1}$O—C$_6$H$_4$—X—C$_6$H$_4$—O—(CH$_2$—CH$_2$O—)$_{n-1}$H (n being an integer from 2 to 140, and X being —CH$_2$—, —C(CH$_3$)$_2$— or —SO$_2$—)
and inert organic particles with median diameter from 0.3 to 20 μm at a concentration of from 3 to 40%, based on the layer of matt appearance. The film has a high level of mattness (gloss below 15), and transparency which is within the bounds of acceptability for specific applications (above 60%). A disadvantage of this film is that if the structure is ABA it is not printable and if the structure is AB it is not processible (on high-speed machinery). In addition, the film has shorcomings in production and its haze level is too high for many applications.

Likewise known from the prior art are matt, biaxially oriented polyester films of milky appearance.

DE-A 23 53 347 describes a process for producing a milky polyester film having one or more layers, which comprises preparing a mixture made from particles of a linear polyester with from 3 to 27% by weight of a homopolymer or copolymer of ethylene or propylene, extruding the mixture as a film, quenching the film, and orienting the same by orientation in directions running perpendicular to one another, and heat-setting the film. A disadvantage of the process is that it is not possible to reuse the regrind arising during production of the film (essentially a mixture of polyester and ethylene copolymer or propylene copolymer) without yellowing of the film. This makes the process uneconomic, and the yellowish film produced with regrind was unacceptable to the market. On increasing the concentration of the copolymer in the polyester, the film generally loses its milky character and becomes white with high opacity.

U.S. Pat. No. 3,154,461 claims a process for producing a biaxially oriented matt-surface film from thermoplastic (e.g. polyethylene terephthalate, poly-propylene), in which the film comprises incompressible particles (e.g. calcium carbonate, silicon dioxide) with size of form 0.3 to 20 μm and at a concentration of from 1 to 25%. The application concerned also claims the matt film produced by the process given therein. However, the haze level of the film produced by the process of the US patent is too high for many applications.

SUMMARY OF THE INVENTION

It was therefore an object of the present invention to provide a biaxially oriented polyester film having at least one matt side and not having the disadvantages of the prior art films mentioned, and having in particular a high degree of mattness together with good transparency, very high ease of production and very good processibility. In addition, care should be taken that the film can also be processed on high-speed machinery. It should moreover be ensured that cut material occurring during film production can be reintroduced into the production process as regrind during production of the film in amounts of up to 60% by weight, based on the total weight of the film, without any significant adverse effect on the physical or optical properties of the film.

According to the invention, the object is achieved by providing a coextruded, biaxially oriented polyester film having at least one matt side and having at least one base layer (B) made from a thermoplastic polyester and having at least one matt outer layer (A) which comprises at least 70% by weight of thermoplastic polyester, based on the total weight of the outer layer (A), wherein the planar orientation Δp of the film is less than or equal to 0.164.

DETAILED DESCRIPTION OF THE INVENTION

The subclaims give preferred embodiments of the invention, which are described in more detail below. According to the invention, the film has at least two layers, the layers then encompassing the base layer (B) and the matt outer layer (A).

To achieve a high degree of mattness together with good transparency and with high ease of production and with very good processibility of the film, according to the invention the planar orientation Δp of the film of the invention has to be less than or equal to a prescribed value. This value is defined as Δp=0.164.

Production of a film with low gloss therefore requires a comparatively low planar orientation Δp. If the planar orientation Δp of the film is higher than the abovementioned value of 0.164, the degree of mattness achieved for the film, or for the matt outer layer (A), and the transparency and the ease of production of the film are for the purposes of the present invention poor. If, on the other hand, the planar orientation Δp of the film is smaller than or equal to the abovementioned value, the degree of mattness of the film or of the matt outer layer (A), and the transparency and the ease of production of the film are for the purposes of the present invention good.

In one preferred embodiment of the invention, the planar orientation Δp of the film of the invention is below 0.161, and in a particularly preferred embodiment it is lower than 0.158.

In the preferred and particularly preferred embodiments, the film of the invention having at least one matt side has a degree of mattness which is comparatively particularly high and a transparency which is comparatively particularly high and an ease of production which is comparatively particularly high.

At least 90% by weight of the base layer (B) is preferably composed of a thermoplastic polyester. Polyesters suitable for this purpose are those made from ethylene glycol and terephthalic acid (polyethylene terephthalate, PET), from ethylene glycol and naphthalene-2,6-dicarboxylic acid (polyethylene 2,6-naphthalate, PEN), from 1,4-bishydroxymethylcyclohexane and terephthalic acid (poly-1,4-cyclohexanedimethylene terephthalate, PCDT), or else made from ethylene glycol, naphthalene-2,6-dicarboxylic acid and biphenyl-4,4'-dicarboxylic acid (polyethylene 2,6-naphthalate bibenzoate, PENBB). Particular preference is given to polyesters at least 90 mol %, preferably at least 95 mol %, of which is composed of ethylene glycol units and terephthalic acid units, or of ethylene glycol units and naphthalene-2,6-dicarboxylic acid units. In one particularly preferred embodiment, the base layer is composed of poly-ethylene terephthalate homopolymer. The remaining monomer units derive from other aliphatic, cycloaliphatic or aromatic diols and, respectively, dicarboxylic acids.

Other examples of suitable aliphatic diols are diethylene glycol, triethylene glycol, aliphatic glycols of the formula HO—$(CH_2)_n$—OH, where n is an integer from 3 to 6 (in particular 1,3-propanediol, 1,4-butanediol, 1,5-pentanediol and 1,6-hexanediol) and branched aliphatic glycols having up to 6 carbon atoms. Among the cycloaliphatic diols, mention should be made of cyclohexanediols (in particular 1,4-cyclohexanediol). Examples of other suitable aromatic diols have the formula HO—$C_6H_4$—X—$C_6H_4$—OH, where X is —$CH_2$—, —$C(CH_3)_2$—, —$C(CF_3)_2$—, —O—, —S— or —$SO_2$—. Bisphenols of the formula HO—$C_6H_4$—$C_6H_4$—OH are also very suitable.

Other aromatic dicarboxylic acids are preferably benzenedicarboxylic acids, naphthalene dicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the $C_3$–$C_{19}$ alkanediacids are particularly suitable, and the alkane moiety here may be straight-chain or branched.

One way of preparing the polyesters is the transesterification process. Here, the starting materials are dicarboxylic esters and diols, which are reacted using the customary transesterification catalysts, such as the salts of zinc, of calcium, of lithium, of magnesium or of manganese. The intermediates are then polycondensed in the presence of well-known polycondensation catalysts, such as antimony trioxide or titanium salts. Another equally good preparation method is the direct esterification process in the presence of polycondensation catalysts. This starts directly from the dicarboxylic acids and the diols.

Matt outer layer (A):

The matt outer layer (A) and any other outer layer (C) present may in principle use polymers which are the same as those used for the base layer (B). Besides these, there may also be other materials present in the outer layers, and in this case the outer layers are preferably composed of a mixture of polymers or of a copolymer or of a homopolymer which comprises ethylene isophthalate units and/or ethylene 2,6-naphthalate units and/or ethylene terephthalate units. Up to 30 mol % of the polymers may be composed of other comonomers.

In one advantageous embodiment, to achieve the desired mattness or the desired degree of mattness, the outer layer (A) comprises an effective amount of from 1.0 to 10.0% by weight of a certain pigment system, based on the total weight of the matt outer layer (A). In one particularly advantageous embodiment of the film, the concentration of particles is from 1.1 to 9.0% by weight, and in one very particularly preferred advantageous embodiment it is from 1.2 to 8.0% by weight.

Typical particle systems advantageous for the degree of mattness of the film are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc or manganese salts of the dicarboxylic acids used, carbon black, titanium dioxide, kaolin or crosslinked polymer particles, e.g. polystyrene particles or acrylate particles.

It is also possible to select mixtures of two or more different particle systems, or mixtures of particle systems of the same chemical makeup but of different particle size. The particles may be added to the polymers of each layer of the film in the respective advantageous concentrations, e.g. as a glycolic dispersion during the polycondensation, or by way of masterbatches during extrusion.

The matt outer layer (A) is comparatively highly filled with inert pigments, to achieve the desired low gloss. In the particularly advantageous embodiment, the concentration of the inert particles in each layer is in the range from 1.1 to 7.5% by weight, and in the very particularly preferred embodiment it is from 1.2 to 5.0% by weight, and essentially depends on the optical properties to be achieved in the film.

Preferred particles are $SiO_2$ in colloidal or in chain-type form. These particles give very good incorporation into the polymer matrix.

To achieve a very high degree of mattness (i.e. very low gloss) and to achieve good ease of production, the outer layer (A) comprises a pigment system in which the median diameter (the $d_{50}$ value) of the pigment grains is in the range from 2.0 to 8.0 μm, and in which the pigment grain diameter scattering expressed in terms of the SPAN 98, is less than or equal to 1.9.

In one particularly advantageous embodiment, the matt outer layer (A) of the film of the present invention comprises a pigment system in which the median diameter of the pigment grains is in the range from 2.1 to 7.9 μm and scattering is less than or equal to 1.8. In one very particularly advantageous embodiment, the matt outer layer (A) of the film of the present invention comprises a pigment system in which the median diameter of the pigment grains is in the range from 2.2 to 7.8 μm and the scattering is less than or equal to 1.7.

In another advantageous embodiment, the matt outer layer (A) comprises, besides the polyethylene terephthalate homopolymer or the polyethylene terephthalate copolymer, another polymeric component 1. This component I is a copolymer composed of the condensation product of the following monomers or of their derivatives capable of forming polyesters:

a) from 65 to 95 mol % of isophthalic acid;

b) from 0 to 30 mol % of at least one aliphatic dicarboxylic acid having the formula $HOOC(CH_2)_nCOOH$, where n is in the range from 1 to 11;

c) from 5 to 15 mol % of at least one sulfomonomer containing an alkali metal sulfonate group on the aromatic moiety of a dicarboxylic acid;

d) a copolymerizable aliphatic or cycloaliphatic glycol having from 2 to 11 carbon atoms, in the stoichiometric amount necessary to form 100 mol % of condensate;

where each of the percentages is based on the total amount of monomers forming component 1. For a detailed description of component I see also EP-A-0 144 878, which is expressly incorporated herein by way of reference.

Component I is advantageously added as another polymeric component of the matt outer layer (A), and its proportion may be up to 30% by weight. In this case component I forms a blend or a mixture with the other polymers present in this layer, or else forms a copolymer by transesterification during extrusion.

For the purposes of the present invention, mixtures are mechanical mixtures prepared from the individual components. For this, the individual constituents are generally combined in the form of small-dimensioned compressed moldings, e.g. lenticular or bead-shaped pellets, and mixed with one another mechanically, using a suitable agitator. Another way of producing the mixture is to feed the component I and the appropriate polymer for the respective layer separately to the extruder for the base layer or other layer, and to carry out mixing in the extruder and/or in the downstream systems for transporting the melt.

For the purposes of the present invention, a blend is an alloy-like composite of the individual components which can no longer be separated into the initial constituents. A blend has properties like those of a homogeneous material and can therefore be characterized by appropriate parameters.

In one advantageous embodiment, the matt outer layer (A) is characterized by the following set of parameters:

a) the film has a roughness expressed in terms of its $R_a$ value in the range from 150 to 1000 nm, preferably from 175 to 950 nm, particularly preferably from 200 to 900 nm. Values below 150 nm have an adverse effect on the degree of mattness of the surface, and values above 1000 nm impair the optical properties of the film.

b) The value measured for surface gas flow is in the range from 1 to 50 s, preferably in the range from 1 to 45 s. At values above 50, the degree of mattness of the film is adversely affected.

The base layer (B) may likewise also comprise conventional additives, such as stabilizers and/or pigments (=fillers). Examples of stabilizers advantageously used are phosphorus compounds, such as phosphoric acid or phosphoric esters.

Typical pigments (fillers) for the base layer (B) are the inorganic and/or organic particles given for the outer layer (s), for example calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc or manganese salts of the dicarboxylic acids used, carbon black, titanium dioxide, kaolin or crosslinked polystyrene particles or crosslinked acrylate particles.

In one particularly advantageous embodiment, the base layer comprises only the pigments introduced via the regrind. This method produces a film with very particularly low haze.

In the advantageous usage form, the film is composed of three layers, the base layer (B) and, applied to the two sides of this base layer, outer layers (A) and (C), at least the outer layer (A) being matt, and the film being produced by the process of the invention.

Between the base layer (B) and the outer layers (A) and/or (C) there may, if desired, also be an intermediate layer. This may again be composed of the polymers described for the base layer (B). In one particularly preferred embodiment, the intermediate layer is composed of the polyester used for the base layer (B). The intermediate layer may also comprise the customary additives described. The thickness of the intermediate layer is generally above 0.3 μm, preferably in the range from 0.5 to 15 μm, in particular in the range from 1.0 to 10 μm and particularly preferably in the range from 1.0 to 5 μm.

In the particularly advantageous three-layer embodiment of the novel film, the thickness of the outer layers (A) and (C) is generally in the range from 0.1 to 5.0 μm, preferably in the range from 0.2 to 4.5 μm, and particularly preferably in the range from 0.3 to 4.0 μm, and the thicknesses of the matt outer layer (A) here may be the same as, or differ from, that of the outer layer (C).

The total thickness of the novel polyester film may vary within certain limits. It is from 3 to 350 μm, in particular from 4 to 300 μm, preferably from 5 to 250 μm, the base layer (B) preferably making up from 5 to 97% of the total thickness.

The invention also provides a process for producing the polyester film of the invention by coextrusion.

The procedure for this process is that the melts corresponding to the individual layers (A), (B) and, where appropriate, (C) of the film are pressed, i.e. coextruded, through a flat-film die, the resultant coextruded melt is drawn off for solidification on one or more rolls, the solidified prefilm is then biaxially stretched (oriented), and the biaxially stretched film is heat-set and, if desired, corona- or flame-treated on the surface layer intended for treatment, and then is wound up.

The biaxial stretching (orientation) is generally carried out sequentially, and preference is given to sequential biaxial stretching in which stretching is first longitudinal (in the machine direction) and then transverse (perpendicular to the machine direction). However, in another embodiment of the process, the biaxial stretching of the film may also take place simultaneously.

As is usual in coextrusion, the polymer or the polymer mixture for the individual layers is first compressed and plasticized in an extruder, and any additives used may already be present in the polymer or the polymer mixture. The melts are then simultaneously extruded through a flat-film die (slot die), and the coextruded melt is drawn off on one or more cooled take-off rolls, whereupon the melt cools and solidifies to form a prefilm.

The biaxial orientation is generally carried out sequentially, preferably orienting first longitudinally (i.e. in the machine direction=MD) and then transversely (i.e. perpendicularly to the machine direction=TD). This gives orientation of the polymer chains. The longitudinal orientation can be carried out with the aid of two rolls running at different speeds corresponding to the desired stretching ratio. For the transverse orientation use is generally made of an appropriate tenter frame, clamping both edges of the film and then drawing toward the two sides at an elevated temperature.

The temperature at which the orientation is carried out may vary over a relatively wide range and depends on the film properties desired. The longitudinal stretching is generally carried out at from about 80 to 130° C., and the transverse stretching at from about 90 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. After the longitudinal stretching and prior to the transverse stretching, one or both surfaces of the film may be in-line coated by known processes. The in-line coating may serve, for example, to give improved adhesion of a metal layer or of any printing ink subsequently to be applied, or else to improve antistatic performance or processing performance.

For producing a film with a very high degree of mattness, improved transparency and improved ease of production (the film having less tendency toward break-offs during orientation), it has proven advantageous for the planar orientation Δp of the film to be less than or equal to 0.164, preferably less than or equal to 0.161, very preferably less than or equal to 0.158. In such cases the roughness of the film is increased, and this is apparent in an improved degree of mattness, the incorporation of the pigments into the polymer matrix is more effective, apparent in improved transparency, and the strength of the film in the direction of its thickness is greater, apparent in improved reliability of the process for producing the film. The increased strength in the direction of thickness of the film reduces the tendency for tearing to be initiated or to propagate in the film during the production process.

The significant variables affecting the planar orientation Δp have been found to be the longitudinal and transverse stretching parameters, and also the SV of the raw material used. The processing parameters include in particular the longitudinal and transverse stretching ratios ($\lambda_{MD}$ and $\lambda_{TD}$), the longitudinal and transverse stretching temperatures ($T_{MD}$ and $T_{TD}$), the film web speed and the nature of the stretching, in particular that in the longitudinal direction of the machine.

For example, if the planar orientation Δp obtained on a film plant is above the values of the invention (e.g. planar orientation Δp=0.171), then increasing the temperatures during longitudinal orientation and transverse orientation and/or lowering the stretching ratios during longitudinal stretching and transverse stretching can enable films of the invention to be produced. Examples of usual values for the parameters mentioned in the case of films, but not those which can be used for matt films of the present invention, are

|  | Longitudinal stretching | Transverse stretching |
| --- | --- | --- |
| Stretching temperatures | 100 to 115° C. | 100 to 115° C. |
| Stretching ratios | 4.3 to 5.0 | 4.2 to 5.0 |

In the case of the films of the invention, the temperatures and stretching ratios are generally within ranges as given in the table below:

|  | Longitudinal stretching | Transverse stretching |
| --- | --- | --- |
| Stretching temperatures | 120 to 135° C. | 120 to 140° C. |
| Stretching ratios | 2.5 to 4.6 | 3.5 to 4.1 |

Further lowering of the stretching ratio $\lambda_{MD}$ is not possible, since the film would then have undesirable defects. If, for example, the longitudinal stretching ratio $\lambda_{MD}$ is lowered below 2.5, the film obtained has transverse defects which, for example, are clearly visible in the metallic layer after the film has been metallized.

For example, if the planar orientation Δp obtained with a machine is 0.173 with the following set of parameters: $\lambda_{MD}$=4.5 and $\lambda_{TD}$=4.2, a longitudinal stretching temperature $T_{MD}$ of 114° C. and a transverse stretching temperature $T_{TD}$ of 121° C., then increasing the longitudinal stretching temperature $T_{MD}$ to 125° C. or increasing the transverse stretching temperature to $T_{TD}$=135° C. or lowering the longitudinal stretching ratio to $\lambda_{MD}$=3.8 or lowering the transverse stretching ratio to $\lambda_{TD}$=3.7 gives a Δp value of 0.162. The film web speed here was 340 m/min, and the SV of the material was about 730. The temperatures given are based on the respective roll temperatures in the case of longitudinal stretching and on infrared-measured film temperatures in the case of transverse stretching.

In the heat-setting which follows, the film is held for from 0.1 to 10 s at a temperature of from 150 to 250° C. The film is then wound up in a conventional manner.

A generalized procedure for achieving the Δp values of the invention, starting from a set of parameters which gives a film whose Δp value is not in accordance with the invention, is advantageously either:

a) to increase the stretching temperature in the MD by ΔT=from 3 to 15 K, preferably by ΔT=from 5 to 12 K, particularly preferably by ΔT=from 7 to 10 K, or b) to lower the stretching ratio in the MD by Δλ=from 0.3 to 0.8, preferably by Δλ=from 0.35 to 0.7, particularly preferably by Δλ=from 0.4 to 0.6, or c) to increase the stretching temperature in the TD by ΔT=from 4 to 15 K preferably by ΔT=from 5 to 12 K, particularly preferably by ΔT=from 6 to 10 K, or d) to lower the stretching ratio in the TD by Δλ=from 0.3 to 0.8, preferably by Δλ=from 0.35 to 0.7, particularly preferably by Δλ=from 0.4 to 0.6.

It is also possible, where appropriate, to combine more than one of the above measures a) to d) with one another. It has proven particularly advantageous here to combine measures a) and b) with one another.

Figure 1:
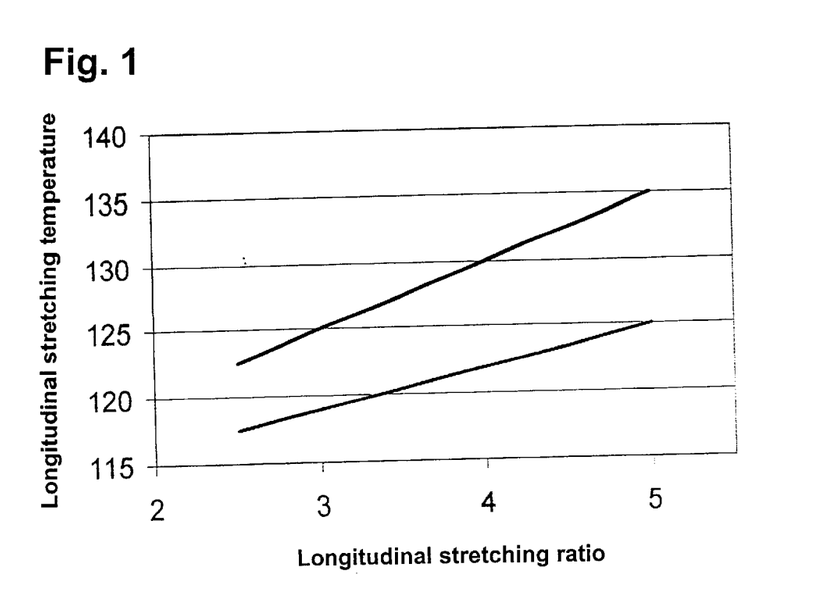
FIG. 1 is a graph showing the relationship between the MD stretching temperature T$_{MD}$ in relation to the MD stretching ratio λ$_{MD}$ as set forth in Eq. 1.

In one particularly advantageous embodiment, measures a) and b) are combined with one another to produce the matt film of the invention with a planar orientation Δp less than or equal to 0.164, in such a way that the following range is maintained for the MD stretching temperature $T_{MD}$ in relation to the MD stretching ratio $\lambda_{MD}$:

$$110+3.0\cdot\lambda_{MD} \leq T_{MD} \leq 110+5.0\lambda_{MD} \qquad \text{Eq. 1}$$

FIG. 1 shows this range by way of the band between the upper and lower straight lines. Conditions can be established here using the procedure given above. If Eq. 1 is satisfied it is ensured that the Δp values are always less than or equal to 0.164 and that the film produced has an ideal degree of mattness.

In the heat-setting which follows, the film is held for from 0.1 to 10 s at a temperature of from 150 to 250° C. The film is then wound up in a conventional manner One or both surfaces of the film is/are preferably corona- or flame-treated by one of the known methods after biaxial stretching. The intensity of treatment here is adjusted so as to give surface tension in the range above 45 mN/m.

The film may also be coated to establish other desired properties. Typical coatings are layers with adhesion-promoting, antistatic, slip-enhancing or release effect. It is, of course, possible for these additional layers to be applied to the film by in-line coating using aqueous dispersions after the longitudinal stretching step and prior to the transverse stretching step.

The film of the invention, having at least one matt side, has excellent optical properties, i.e. low gloss together with high transparency, very high ease of production and very good processing performance.

In addition, it has been ensured that cut material arising during film production can be reintroduced to the extrusion process as regrind during production of the film in amounts of up to 70% by weight, based on the total weight of the film, without any significant adverse effect on the physical properties of the film, in particular its appearance.

The film therefore has excellent suitability for use in flexible packaging and specifically wherever its excellent optical properties and its good processability are of particular importance, as particularly in its use on high-speed packaging machinery.

The table below (Table 1) gives once again a quick overview of the most important film properties of the invention.

The following test methods were utilized for the purposes of the present invention to characterize the raw materials and the films:

SV (standard viscosity)

Standard viscosity SV (DCA) is measured in dichloroacetic acid by a method based on DIN 53726.

Intrinsic viscosity (IV) is calculated as follows from standard viscosity $$IV(DCA)=6.907\cdot10^{-4}SV(DCA)+0.063096$$

Coefficient of friction (COF)

Coefficient of friction was determined to DIN 53 375. The coefficient of sliding friction was measured 14 days after production.

Surface tension

Surface tension was determined by what is known as the ink method (DIN 53 364).

Haze

Hölz haze was measured by a method based on ASTM-D 1003-52 but, in order to utilize the most effective measurement range, measurements were made on four pieces of film laid one on top of the other, and a 1° slit diaphragm was used instead of a 4° pinhole.

Gloss

Gloss was determined to DIN 67 530. Reflectance was measured, as an optical value characteristic of a film surface. Based on the standards ASTM-D 523-78 and ISO 2813, the angle of incidence was set at 20° or 60°. A beam of light hits the flat test surface at the set angle of incidence and is reflected and/or scattered thereby. A proportional electrical variable is displayed representing light rays hitting the photoelectronic detector. The value measured is dimensionless and must be stated together with the angle of incidence.

Surface gas flow time

The principle of the test method is based on the air flow between one side of the film and a smooth silicon wafer sheet. The air flows from the surroundings into an evacuated space, and the interface between film and silicon wafer sheet acts as a flow resistance.

A round specimen of film is placed on a silicon wafer sheet in the middle of which there is a hole providing the connection to the receiver. The receiver is evacuated to a pressure below 0.1 mbar. The time in seconds taken by the air to establish a pressure rise of 56 mbar in the receiver is determined.

TABLE 1

| | Range | | | | |
|---|---|---|---|---|---|
| | general | preferred | particularly preferred | Unit | Test method |
| OUTER LAYER A | | | | | |
| Gloss, 60° | <80 | <70 | <60 | | DIN 67530 |
| COF | <0.6 | <0.5 | <0.40 | | DIN 53375 |
| Average roughness $R_a$ | 150–1000 | 175–950 | 200–900 | nm | DIN 4768, cutoff of 0.25 mm |
| Range of value measured for surface gas flow | 1–50 | 1–45 | | sec | internal |
| Film properties | | | | | |
| Haze | <50 | <45 | <40 | % | ASTM-D 1003–52 |
| Planar orientation Δp | ≤0.164 | ≤0.161 | ≤0.158 | | internal |

| Test conditions: | |
|---|---|
| Test area | 45.1 cm$^2$ |
| Weight applied | 1276 g |
| Air temperature | 23° C. |
| Humidity | 50% relative humidity |
| Aggregated gas volume | 1.2 cm$^3$ |
| Pressure difference | 56 mbar |

Determination of planar orientation $\Delta p$

Planar orientation is determined by measuring the refractive index with an Abbe refractometer according to internal operating prescription 24.

Preparation of specimens:

Specimen size and length: from 60 to 100 mm Specimen width: corresponds to prism width of 10 mm To determine $n_{MD}$ and $n_a$ (=$n_z$), the specimen to be tested has to be cut out from the film with the running edge of the specimen running precisely in the direction TD. To determine $n_{TD}$ and $n_a$ (=$n_z$), the specimen to be tested has to be cut out from the film with the running edge of the specimen running precisely in the direction MD. The specimens are to be taken from the middle of the film web. Care must be taken that the temperature of the Abbe refractometer is 23° C. Using a glass rod, a little diiodomethane (N=1.745) or diiodomethane-bromo-naphthalene mixture is applied to the lower prism, which has been cleaned thoroughly before the test. The refractive index of the mixture must be greater than 1.685. The specimen cut out in the direction TD is firstly laid on top of this, in such a way that the entire surface of the prism is covered. Using a paper wipe the film is now firmly pressed flat onto the prism, so that it is firmly and smoothly positioned thereon. The excess liquid must be sucked away. A little of the test liquid is then dropped onto the film. The second prism is swung down and into place and pressed firmly into contact. The right-hand knurled screw is then used to turn the indicator scale until a transition from light to dark can be seen in the field of view in the range from 1.62 to 1.68. If the transition from light to dark is not sharp, the colors are brought together using the upper knurled screw in such a way that only one light and one dark zone are visible. The sharp transition line is brought to the crossing point of the two diagonal lines (in the eyepiece) using the lower knurled screw. The value now indicated on the measurement scale is read off and entered into the test record. This is the refractive index $n_{MD}$ in the machine direction. The scale is now turned using the lower knurled screw until the range visible in the eyepiece is from 1.49 to 1.50.

The refractive index $n_a$ or $n_z$ (in the direction of the thickness of the film) is then determined. To improve the visibility of the transition, which is only weakly visible, a polarization film is placed over the eyepiece. This is turned until the transition is clearly visible. The same considerations apply as in the determination of $n_{MD}$. If the transition from light to dark is not sharp (colored), the colors are brought together using the upper knurled screw in such a way that a sharp transition can be seen. This sharp transition line is brought into the crossing point of the two diagonal lines using the lower knurled screw, and the value indicated on the scale is read off and entered into the table.

The specimen is then turned, and the corresponding refractive indices $n_{MD}$ and $n_a$(=$n_z$) of the other side are measured and entered into an appropriate table.

After determining the refractive indices in, respectively, the direction MD and the direction of the thickness of the film, the specimen strip cut out in the direction MD is placed in position and the refractive indices $n_{TD}$ and $n_a$(=$n_z$) are determined accordingly. The strip is turned over, and the values for the B side are measured. The values for the A side and the B side are combined to give average refractive indices. The orientation values are then calculated from the refractive indices using the following formulae:

$$\Delta n = n_{MD} - n_{TD}$$

$$\Delta p = (n_{MD} + n_{TD})/2 - n_z$$

$$\Delta n_{av} = (n_{MD} + n_{TD} + n_z)/3$$

Measurement of median particle diameter $d_{50}$

The median particle diameter $d_{50}$ was measured by laser on a Malvern MasterSizer by the standard method (examples of other measurement devices are the Horiba LA 500 or Sympathec Helos, which use the same principle of measurement). For the tests, the specimens were placed in a cell with water, and this was then placed into the test device. The test procedure is automatic and includes the mathematical determination of the $d_{50}$ value.

Figure 2:
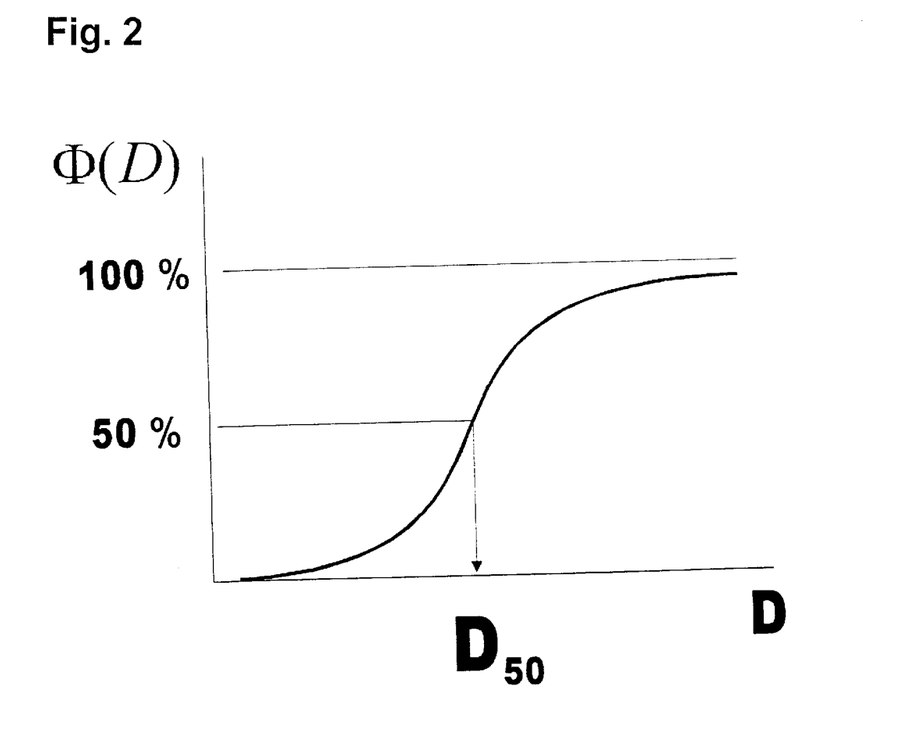
FIGS. 2 and 3 are graphs illustrating the methods of calculating the median particle diameter d$_{50}$ and the SPAN 98, respectively.

The $d_{50}$ value here is determined as defined from the (relative) cumulative particle size distribution curve: the point of intersection of the 50% ordinate with the cumulative curve directly gives the desired $d_{50}$ value on the abscissa axis, as shown more precisely on the graph of FIG. 2.

Measurement of SPAN 98

The test device used to determine SPAN 98 was the same as that described above for the determination of median diameter $d_{50}$. SPAN 98 is defined here as follows:

$$SPAN98 = \frac{D_{98} - D_{10}}{D_{50}}$$

Figure 3:
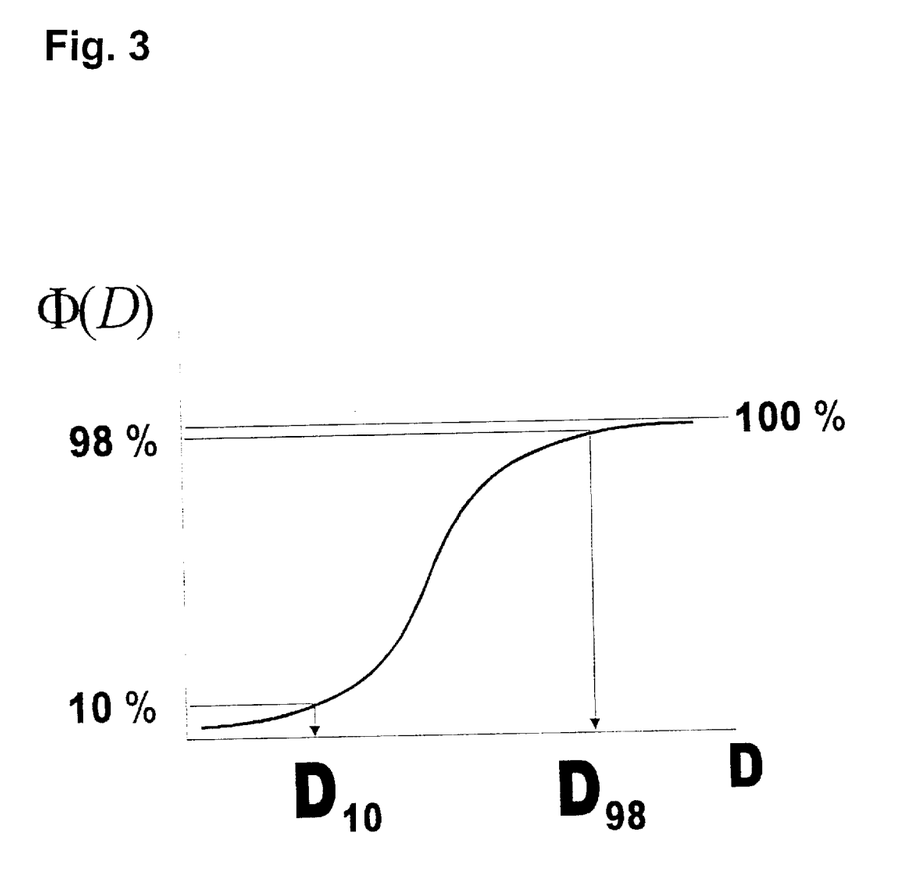

The (relative) cumulative particle size distribution curve is again used as a basis for determining $d_{98}$ and $d_{10}$. The point of intersection of the 98% ordinate value with the cumulative curve gives the desired $d_{98}$ value directly on the abscissa axis, and the point of intersection of the 10% ordinate value with the cumulative curve gives the desired $d_{10}$ value directly on the abscissa axis, as shown more precisely on the graph of FIG. 3.

EXAMPLE 1

Chips made from polyethylene terephthalate (prepared by the transesterification process with Mn as transesterification catalyst, Mn concentration: 100 ppm) were dried at 150° C. to residual moisture below 100 ppm and fed to the extruder for the base layer (B). Chips made from polyethylene terephthalate and from a filler were likewise fed to the extruder for the non-matt outer layer (C).

Alongside this, chips were prepared from a polyethylene terephthalate (prepared by the transesterification process with Mn as transesterification catalyst, Mn concentration: 100 ppm) and dried at a temperature of 150° C. to residual moisture below 100 ppm, and fed, together with the filler of the invention, to the extruder for the matt outer layer (A).

A transparent, three-layer film of ABC structure and with a total thickness of 12 μm was then produced by coextrusion followed by stepwise longitudinal and transverse orientation. The thickness of each outer layer is given in Table 2.

| Outer layer (A) was a mixture made from: | |
|---|---|
| 40% by weight of | polyethylene terephthalate with SV of 800 and |
| 60% by weight of | masterbatch made from 95% by weight of polyethylene terephthalate and 5.0% by weight of silica particles (®Sylysia 430 from Fuji, Japan) with $d_{50}$ value of 3.4 μm and SPAN 98 of 1.4. |
| Base layer (B): 100.0% by weight of | polyethylene terephthalate with SV of 800 |
| Outer layer (C) was a mixture made from: | |
| 93.0% by weight of | polyethylene terephthalate with SV of 800 and |
| 7.0% by weight of | masterbatch made from 97.75% by weight of polyethylene terephthalate, 1.0% by weight of ®Sylobloc 44 H (synethic $SiO_2$ from Grace) and 1.25% by weight of ®Aerosil TT 600 (fumed $SiO_2$ from Degussa). |

The production conditions in each step of the process were:

| Extrusion: | Temperatures | Layer A: | 290° C. |
|---|---|---|---|
| | | Layer B: | 290° C. |
| | | Layer C: | 290° C. |
| | Take-off roll temperature | | 25° C. |
| Longitudinal stretching: | Stretching temperature: | | 125° C. |
| | Longitudinal stretching ratio: | | 4.1 |
| Transverse stretching: | Stretching temperature: | | 130° C. |
| | Transverse stretching ratio: | | 3.9 |
| Setting: | Temperature: | | 230° C. |
| | Duration: | | 3 s |

The planar orientation was in the range of the invention, at Δp=0.159. The film had the required low gloss and the required low haze. Furthermore, the film could be produced very efficiently, i.e. with no break-offs, and also exhibited the required processing performance. Tables 2 and 3 show the structure of the films and the properties achieved in films produced in this way.

EXAMPLE 2

The outer layer thickness of the matt outer layer (A) was raised from 1.5 to 2.0 μm, while the structure of the film and the method of production were otherwise as in Example 1. The result was an improvement in the degree of mattness of the film.

EXAMPLE 3

A film of 23 μm thickness was produced by comparison with Example 1. This meant that the speed of the machine was lowered by a factor corresponding to the thickness (output remaining constant). In order to obtain the planar orientation of the invention, the process conditions were slightly modified. The outer layer thickness for the matt layer (A) was 2.5 μm and that for the non-matt layer (C) was 2.0 μm. The result was a film with still lower gloss.

| Extrusion: | Temperatures | Layer A: | 290° C. |
|---|---|---|---|
| | | Layer B: | 290° C. |
| | | Layer C: | 290° C. |
| | Take-off roll temperature | | 25° C. |
| Longitudinal stretching: | Stretching temperature: | | 124° C. |
| | Longitudinal stretching ratio: | | 4 |

-continued

| Transverse stretching: | Stretching temperature: | 129° C. |
|---|---|---|
| | Transverse stretching ratio: | 3.9 |
| Setting: | Temperature: | 230° C. |
| | Duration: | 3 s |

EXAMPLE 4

The makeup of the outer layer (A) of matt appearance was changed from that of Example 3. Instead of the polyethylene terephthalate with SV value of 800, 20% by weight of the polymeric component I were now added to the outer layer (A) of matt appearance. This component I has the following makeup:

a) 90 mol % of isophthalic acid;

b) 10 mol % of the sodium salt of 5-sulfoisophthalic acid;

c) 100 mol % of ethylene glycol.

Introducing component I into the matt outer layer (A) further improved the transparency of the film.

| Outer layer (A) was a mixture made from: | |
|---|---|
| 20% by weight of | polyethylene terephthalate with SV value of 800 |
| 20% by weight of | component I and |
| 60% by weight of | masterbatch made from 95% by weight of polyethylene terephthalate and 5.0% by weight of silica particles (®Sylysia 430 from Fuji, Japan) with $d_{50}$ of 3.4 μm and SPAN 98 of 1.4. |

Comparative Example 1

Unlike in Example 1, the manner of production of the film was such as not to comply with the inventive condition that the planar orientation Δp is less than or equal to 0.164. The production conditions for each step of the process were:

| Extrusion: | Temperatures | Layer A: | 290° C. |
|---|---|---|---|
| | | Layer B: | 290° C. |
| | | Layer C: | 90° C. |
| Longitudinal stretching: | Stretching temperature: | | 115° C. |
| | Longitudinal stretching ratio: | | 4.4 |
| Transverse stretching: | Stretching temperature: | | 121° C. |
| | Transverse stretching ratio: | | 4.2 |
| Setting: | Temperature: | | 230° C. |
| | Duration: | | 3 s |

The degree of mattness of the film and its transparency, and the ease of production became markedly poorer.

TABLE 2

| Example | Film thickness in µm | Film structure | Layer thicknesses in µm A | B | C | Pigments in layers A | B | C | Median pigment diameter in layers in µm A | B | C | Pigment concentrations in ppm A | B | C |
|---|---|---|---|---|---|---|---|---|---|---|---|---|---|---|
| E 1 | 12 | ABC | 1.5 | 9 | 15 | Sylysia 430 | none | Sylobloc 44 H Aerosil TT 600 | 3.4 | | 2.5 0.04 | 30,000 | 0 | 700 750 |
| E 2 | 12 | ABC | 2.0 | 8.5 | 15 | Sylysia 430 | none | Sylobloc 44 H Aerosil TT 600 | 3.4 | | 2.5 0.04 | 30,000 | 0 | 700 750 |
| E 3 | 23 | ABC | 2.5 | 18.5 | 20 | Sylysia 430 | none | Sylobloc 44 H Aerosil TT 600 | 3.4 | | 2.5 0.04 | 30,000 | 0 | 700 750 |
| E 4 | 23 | ABC | 2.5 | 18.5 | 20 | Sylysia 430 | none | Sylobloc 44 H Aerosil TT 600 | 3.4 | | 2.5 0.04 | 30,000 | 0 | 700 750 |
| CE 1 | 12 | ABC | 1.5 | 9 | 15 | Sylysia 430 | none | Sylobloc 44 H Aerisil TT 600 | 3.4 | | 2.5 0.04 | 30,000 | 0 | 700 750 |

TABLE 3

| Example | Coefficient of friction COF Side C against side C | Average roughness $R_a$ Side A | Side C | Values measured for surfaces gas flow Side A | Side C | Δp | Gloss Side A | Side C | Haze | Production performance |
|---|---|---|---|---|---|---|---|---|---|---|
| E 1 | 40 | 230 | 60 | 10 | 130 | 0.156 | 45 | 140 | 38 | ++ |
| E 2 | 40 | 250 | 60 | 8 | 130 | 0.156 | 40 | 142 | 39 | ++ |
| E 3 | 41 | 250 | 60 | 6 | 130 | 0.157 | 35 | 140 | 41 | ++ |
| E 4 | 40 | 250 | 60 | 6 | 130 | 0.157 | 32 | 140 | 32 | ++ |
| CE 1 | 45 | 210 | 50 | 15 | 135 | 0.166 | 55 | 150 | 55 | − |

Key to production performance of films:
++ no break-off, low production costs
− frequent break-offs, high production costs for film

What is claimed is:

1. A coextruded, biaxially oriented polyester film having at least one malt side and composed of at least one base layer (B) made from a thermoplastic polyester, and of, applied to this base layer (B), at least one matt outer layer (A) which comprises at least 70% by weight of thermoplastic polyester, based on the total weight of the matt outer layer (A), wherein the planar orientation p of the film is less or equal to 0.164 wherein the matt outer layer (A) comprises a pigment system in which the median diameter ($d_{50}$) of the pigment grains is in the range from 2.0 to 8.0 pin, and in which the pigment grain diameter scattering expressed in terms of the SPAN 98, is less than or equal to 1.9.

2. The polyester film as claimed in claim 1, wherein the planar orientation Δp of the film is less than or equal to 0.161.

3. The polyester film as claimed in claim 1, wherein the gloss of the matt outer layer (A) is less than or equal to 80.

4. The polyester film as claimed in claim 1, wherein the haze of the film is less than or equal to 50.

5. The polyester film as claimed in claim 1, wherein the matt outer layer (A) comprises an effective amount in the range from 1.0 to 10.0% by weight of a pigment system, based on the total weight of the matt outer layer (A).

6. The polyester film as claimed in claim 1, wherein the matt outer layer (A) comprises, besides ethylene terephthalate homopolymer or ethylene terephthalate copolymer, another polymeric component I which is a copolymer composed of the condensation product of the following monomers or, respectively, their derivatives capable of forming polyesters:

a) from 65 to 95 mol % of isophthalic acid;

b) from 0 to 30 mol % of at least one aliphatic dicarboxylic acid having the formula $HOOC(CH_2)_nCOOH$, where n is in the range from 1 to 11;

c) from 5 to 15 mol % of at least one sulfomonomer containing an alkali metal sulfonate group on the aromatic moiety of a dicarboxylic acid;

d) a copolymerizable aliphatic or cycloaliphatic glycol having from 2 to 11 carbon atoms, in the stoichiometric amount necessary to form 100 mol % of condensate;

where each of the percentages is based on the total amount of monomers forming component I.

7. The polyester film as claimed in claim 6, wherein the matt outer layer (A) comprises up to 30% by weight of component I.

8. The polyester film as claimed in claim 1, wherein the matt outer layer (A) has a roughness expressed in terms of its $R_a$ value in the range from 150 to 1000 nm, and wherein the value measured for surface gas flow is in the range from 1 to 50 s.

9. The polyester film as claimed in claim 1 to, wherein the total thickness of the polyester film is in the range from 3 to 350 µm wherein 5 to 97% of the total thickness being made up by the base layer (B).

10. A process for producing the polyester film as claimed in claim 1 by coextrusion in which the melts corresponding to the separate layers (A), (B) of the film are extruded together through a flat-film die, the resultant coextruded melt is drawn off for solidification on one or more rollers, the solidified prefilm is then biaxially stretched, and the biaxially stretched film is heat-set and, optionally corona- or flame-treated on the surface intended for treatment, and is then wound up, which comprises carrying out the longitudinal stretching at a temperature in the range from 80 to 130° C. and the transverse stretching in the range from 90 to 150° C., and comprises using a longitudinal stretching ratio in the range from 2.5:1 to 6:1, and using a transverse stretching ratio in the range from 3.0:1 to 5.0:1.

11. The process as claimed in claim 10, wherein one or both surfaces of the film are in-line coated after the longitudinal stretching process and prior to the transverse stretching process.

12. The process as claimed in claim 10, wherein, for heat-setting, the film is held at a temperature in the range from 150 to 250° C. for a period in the range from 0.1 to 10 s.

13. The process as claimed in claim 10, wherein the following range is maintained for the MD stretching temperature $T_{MD}$ in relation to the MD stretching ratio $\lambda_{MD}$:

$$110+3.0 \cdot \lambda_{MD} \leq I_{MD} \leq 110+5.0 \cdot \lambda_{MD}.$$

14. The process as claimed in claim 10, wherein cut material arising during the process to produce the film is reintroduced to the extrusion process as regrind in amounts in the range from 20 to 70% by weight, based on the total weight of the film.

* * * * *